July 15, 1924.                    W. COOPER                    1,501,311
                                    BRAKE
                            Filed May 31, 1922           2 Sheets-Sheet 1

WITNESSES                                                INVENTOR
                                                         WM. COOPER,
                                                         BY
                                                         ATTORNEYS

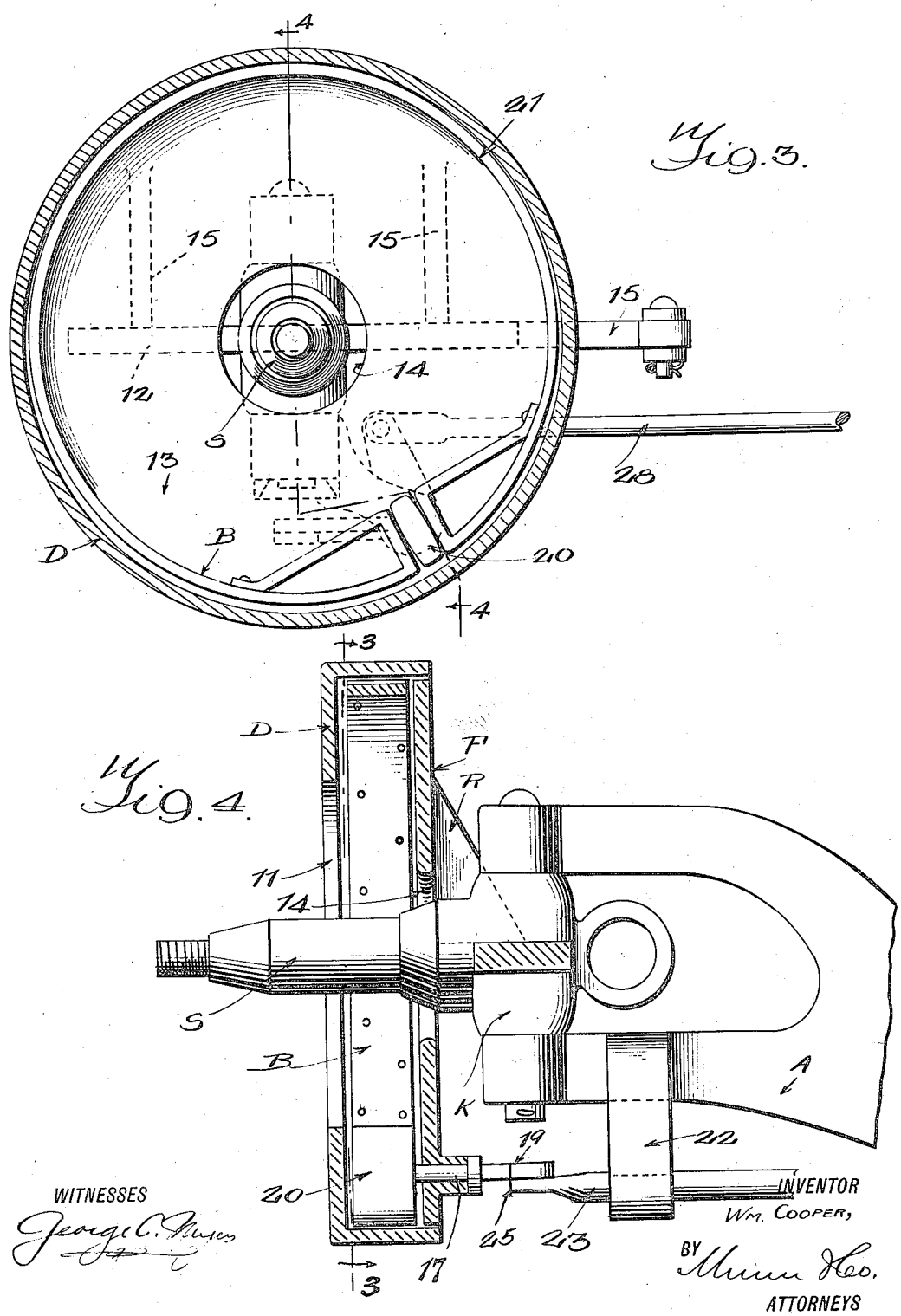

Patented July 15, 1924.

1,501,311

UNITED STATES PATENT OFFICE.

WILLIAM COOPER, OF NEW ORLEANS, LOUISIANA, ASSIGNOR OF ONE-HALF TO JOSEPH ALBERT MARCK, OF NEW YORK, N. Y.

BRAKE.

Application filed May 31, 1922. Serial No. 564,693.

*To all whom it may concern:*

Be it known that I, WILLIAM COOPER, a citizen of the United States, and a resident of New Orleans, in the parish of Orleans and State of Louisiana, have invented certain new and useful Improvements in Brakes, of which the following is a specification.

This invention relates to brakes for the front wheels of a motor vehicle.

The object of the invention is to provide brake means for the front wheels of a motor vehicle whereby to add to the braking facilities usually employed for the rear wheels of a motor vehicle in bringing the motor vehicle to a quick stop.

It is a further object of the invention that the brakes applied to the front wheels of the motor vehicle in accordance with the present invention will not interfere with the steering thereof.

It is also within the scope of the invention that the brakes for the front wheels of the motor vehicle be exceedingly simple in construction and durable.

Other objects, and objects relating to details of construction, combination and arrangement of parts will hereinafter appear in the detailed description to follow.

The invention is illustrated by way of example in the accompanying drawings, in which:—

Figure 3 is a vertical sectional view taken substantially on the lines 3—3 of Figure 4.

Figure 4 is a sectional view taken substantially on the lines 4—4 of Figure 3.

Figure 1:
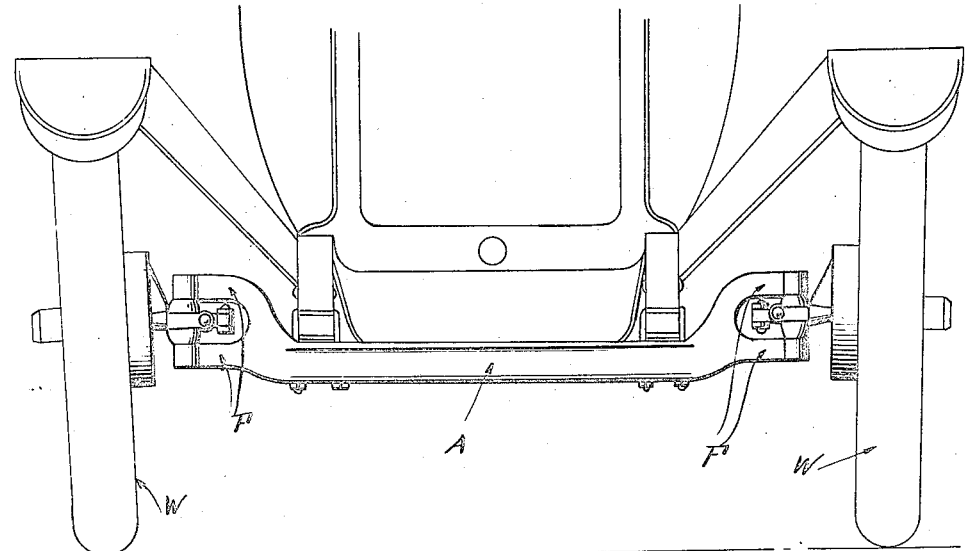
Figure 1 is a partial view in front elevation of a motor vehicle to which the present invention has been applied.
Figure 2:
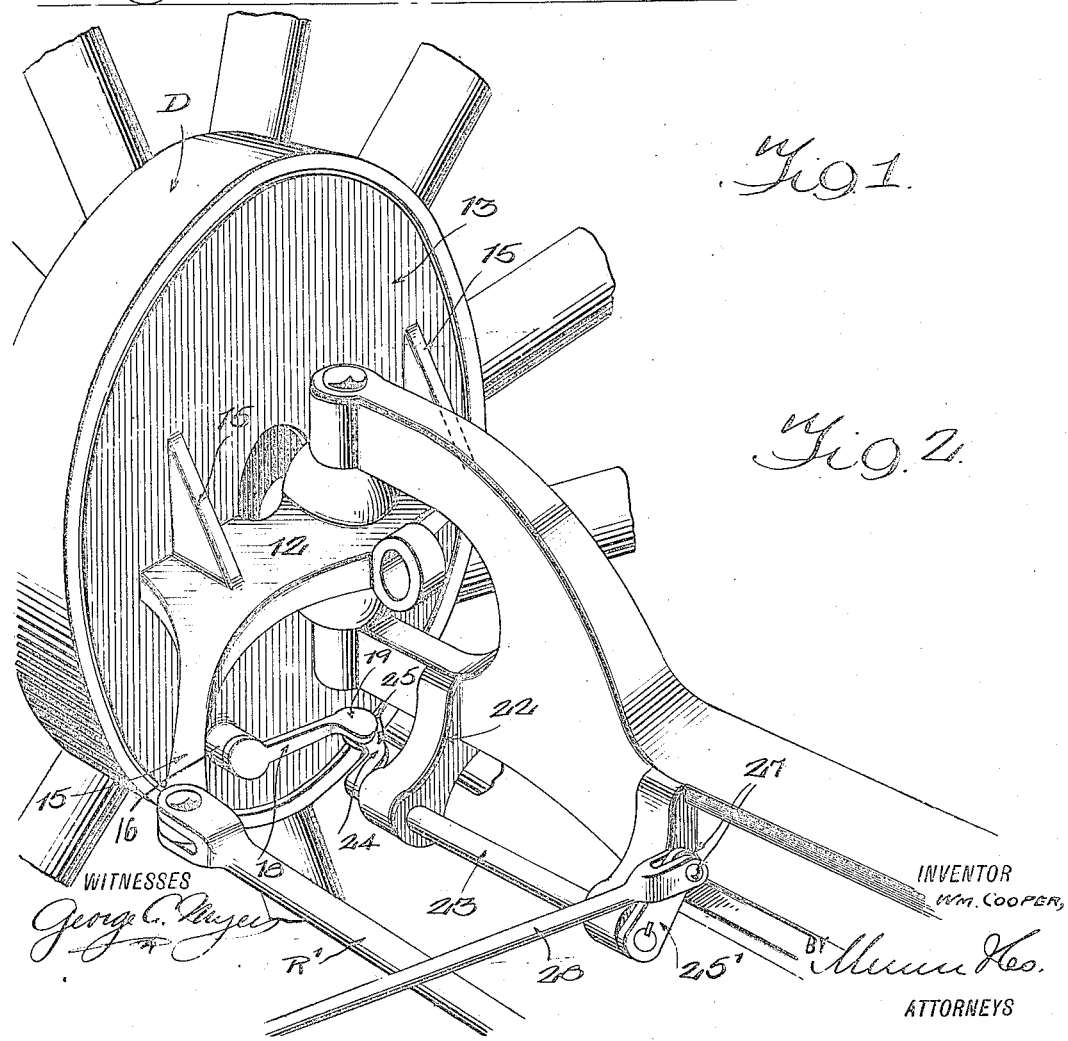
Figure 2 is an enlarged detailed perspective view illustrating the application of the invention to a front wheel of a motor vehicle.

Referring to the drawings more particularly, A indicates generally a front axle structure of standard design, said axle terminating at each of its ends in a pair of forks F in the usual manner, and said forks in each instance supporting through a steering knuckle K and a spindle S, a wheel W.

Upon each wheel in the present instance, there is mounted a brake drum D, said drum being suitably secured upon the inner side of the wheel in any preferable manner and having its inner side open and its outer side formed with an enlarged opening 11, adapted to accommodate the hub of the associated wheel. Upon the steering knuckle K there is formed a web plate 12 which in turn has formed therewith a circular plate member 13, said plate member being disposed in a vertical plane and being formed centrally thereof with an opening 14 through which the associated spindle S may extend. Also the plate may be further secured to the web 12 by ribs 15' if so desired in order that the construction may be more durable. The plate 13 is adapted to freely fit within the drum D. Each web plate 12 also has formed therewith a rearward extending arm 15 which also extends inwardly and downwardly, and to the free end of which, in each instance, there may be pivotally connected the usual connecting rod R' for the steering mechanism of the motor vehicle.

The plate 13 is formed with a nipple 16 in which there is journaled the crank pin 17 of a lever 18. The crank pin 17 is preferably formed with the one end of the lever 18 and the other end of said lever is formed with a circular head 19. The free end of the crank pin 17 carries a cam 20 which is adapted to engage the free ends of the brake band 21 for expanding the same so that it may frictionally engage with the inner periphery of the brake drum D. This particular construction of brake drum, brake band and cam for operating the same is conventional.

Adjacent each end of the axle A there is formed a pair of bracket bearings 22 which are adapted to rotatably support a crank shaft 23. The crank shaft 23, in each instance, terminates at its outer end in a crank arm 24 which in turn terminates in a circular head 25 adapted to engage the similar head 19 of the lever 18 in the manner shown.

Upon the inner end of each shaft 23 there may be secured or formed a crank arm 25' which may be pivotally connected to its free end as indicated generally at 27 with a brake rod 28.

In the use of the present invention, if it is desired to bring the motor vehicle to a quick stop the brakes for both the front and rear wheel would be simultaneously applied. In applying the front brakes, the brake rod 28 would move rearwardly and rotate the crank shaft 23 for swinging the lever arm 18 upwardly which in turn would move the cam 20 to expand the brake bar 21.

It is believed from the foregoing that the many advantages arising for providing brake means for the front wheels of a motor vehicle may be obvious. It should be mentioned that by using the brakes for the front wheels that the skidding of the wheel of a motor vehicle may be materially decreased. Furthermore the motor vehicle may be brought to a quick stop without injuring the brake shifters therefor which is also entirely obvious.

It should be obvious to one familiar with braking mechanism for motor vehicles that the rod 28 for imparting motion to the operating elements of this arrangement may be operated simultaneously through the remote pedal or device, which also operates brakes for the rear wheels.

While I have shown and described the preferred form of my invention, I wish it to be understood that I am aware of the fact that the construction, combination and arrangement of parts may be changed by those skilled in the art without departing from the spirit of my invention, as indicated by the appended claims.

I claim:—

1. In a brake mechanism for a steering wheel of a motor vehicle, a brake drum secured to the hub of said steering wheel, a braking mechanism within said drum, a closure for the inner side of the brake drum, said closure being supported by the steering knuckle of the wheel, a crank arm rotatably supported by the closure and adapted to actuate said brake mechanism when rotated in a predetermined direction, a shaft rotatably supported by the front axle to which the steering wheel is connected, a crank arm carried by said shaft and the free end of said crank arm adapted to engage the free end of the crank arm carried by said plate closure and adapted to be utilized for operating said brake when the shaft is rotated in a predetermined direction, and means whereby said shaft may be rotated from a remote point.

2. In a brake mechanism for a steering wheel of a motor vehicle, a brake drum carried by the hub of said wheel, a braking mechanism within said brake drum, a crank member operatively supported from means projecting from the steering knuckle of said steering wheel, said crank arm being adapted to actuate the braking mechanism when rotated in a predetermined direction, lugs extending from the front axle of the associated steering wheel, a shaft rotatably supported by said lugs, a crank arm carried by said shaft and adapted to engage the crank arm carried by the steering knuckle and actuate said braking mechanism when rotated in a certain direction, and means whereby said shaft may be rotated from a remote point.

WILLIAM COOPER.